(12) United States Patent
Patire (10) Patent No.: US 6,430,232 B1
(45) Date of Patent: Aug. 6, 2002

(54) PHASE CONSTELLATION MODULATOR (75) Inventor: Anthony D. Patire, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/237,241

(22) Filed: Jan. 26, 1999

(51) Int. Cl.$^7$ .......................... H03C 3/00; H04L 27/12; H03K 7/00

(52) U.S. Cl. ....................................... 375/302; 332/100

(58) Field of Search ................................ 375/271, 272, 375/274, 302, 303, 305, 261; 332/100, 101, 144, 103; 370/215; 455/42

(56) References Cited

U.S. PATENT DOCUMENTS

| | | | | |
|---|---|---|---|---|
| 4,750,192 A | * | 6/1988 | Dzung | 375/302 |
| 4,897,620 A | * | 1/1990 | Paradise | 332/100 |
| 5,022,054 A | * | 6/1991 | Wang | 375/305 |
| 5,942,955 A | * | 8/1999 | Matui | 332/101 |
| 6,025,758 A | * | 2/2000 | Lu | 332/100 |

OTHER PUBLICATIONS

Low Complexity GMSK Modulator and Demodulator for Integrated Circuit Implementation, S. McGrath and C.J. Burkley, University of Limerick, Ireland; IEEE, 1990.

Principles of Digital and Analog Communications, Second Edition, Jerry D. Gibson; Chapter 6, pp. 139–161; Prentice Hall, 1993.

Principles of Digital and Analog Communications, Second Edition, Jerry D. Gibson; Chapter 13, pp. 382–393; Prentice Hall, 1993.

GMSK for the Advanced EHF Waveform, Kenneth J. Hetling, Massachusetts Institute of Technology, Lincoln Laboratory, Sept, 1997.

Minimum Shift Keying: A Pectrally Efficient Modulation, Subbarayan Pasupathy, IEEE Communications Magazine, pp. 14–22, 1979.

* cited by examiner

*Primary Examiner*—Betsy L. Deppe
(74) *Attorney, Agent, or Firm*—McAndrews, Held & Malloy, Ltd.

(57) ABSTRACT

The present invention provides a method and apparatus for implementing a continuous phase modulation with an approximate phase constellation. The method reduces complexity by using fewer than all phase points of the nominal phase constellation. The method includes the steps of storing (502) an approximate phase constellation of phase points (100) selected from a nominal phase constellation of phase points, identifying (504) a next phase in the approximate phase constellation of phase points using an N-bit input word, and outputting (506) the next phase. In reducing the number of phase points used in the modulation, the method may store only unique phase points in said phase constellation, and may further reduce the number of phase points by storing only those phase points differing by at least a phase threshold. In identifying the next phase, the method may shift (604) an input bit into an N-bit shift register (with an N-bit output) and apply the N-bit output (606) as an address to a memory that stores the subset of phase points. The memory thereby outputs (608) the next phase.

30 Claims, 6 Drawing Sheets

PHASE CONSTELLATION MODULATOR

BACKGROUND OF THE INVENTION

The present invention relates to phase constellation modulators. In particular, the present invention relates to reduced complexity phase constellation modulators for continuous phase modulation (CPM) communication systems.

A number of modulation schemes are widely used in communication systems. For example, Binary Phase Shift Keying (BPSK), Quadrature Phase Shift Keying (QPSK), Minimum Shift Keying (MSK), Gaussian Minimum Shift Keying (GMSK) and the like are often used to encode raw data into single-bit or multi-bit symbols for digital transmission. In QPSK, for example, two bits are represented by transmitting a waveform with one of four possible phase offsets (e.g., plus/minus 45 degrees and plus/minus 135 degrees) of a carrier, cos(wt+phase), during each symbol time duration.

Each of the various types of modulation, of course, has its own advantages and its own drawbacks when used in any particular communication system. For example, both BPSK and QPSK modulations exhibit a power spectral density (PSD) with large side lobes that can cause adjacent channel interference (ACI). The effect of ACI can be mitigated by increasing the frequency separation between channels. However, this solution will result in the reduction of the number of frequency channels that may exist within a given frequency band, and thus reduce the information carrying capacity of the frequency band. The utilization of a filtering process to reduce the side lobes, unfortunately, introduces both intersymbol interference (ISI)—interference between the symbols in the same frequency channel, as well as additional system complexity.

Thus, the communication industry has turned to modulation schemes that are by definition bandwidth efficient to begin with. In other words, rather than trying to effect bandwidth efficiency through filtering to remove sidelobes, the communication industry has turned to bandwidth efficient types of modulation. A more bandwidth efficient modulation, such as minimum shift keying (MSK) eliminates step changes in the phase of the transmitted waveform and is therefore denoted as a CPM. Filtered forms of MSK, such as GMSK, will eliminate step changes in the frequency of the transmitted waveform. Thus, for GMSK, a controlled amount of ISI is introduced into the waveform and symbols are transmitted as gradual changes in phase. The result is that the GMSK waveform has a power spectral density (PSD) that falls off extremely quickly, thereby allowing frequency channels to be packed closely together.

GMSK and other CPMs enable the information carrying capacity and bandwidth efficiency (and potential revenues) of a communication system to be increased. Additional details on modulation techniques may be found, for example, in Chapters 6 and 13 of *Principles of Analog and Digital Communications,* Second Edition, Jerry D. Gibson, Prentice-Hall (1993).

In the past, however, CPMs have been implemented in unduly complex fashion. As an example, past GMSK modulators unnecessarily required hardware to accumulate a running sum of frequency deviation pulses to determine the phase of the modulated waveform. Generally in a digital implementation of a CPM, only a finite number of phase states is possible, but even systems that precompute the phase states have failed to realize several valid simplifying aspects of CPMs that greatly reduce the complexity of the modulator.

Each reduction in complexity not only decreases the cost of the communication system, but increases the reliability, manufacturability, and maintainability of the communication system. A need has long existed in the industry for a reduced complexity phase constellation modulator.

BRIEF SUMMARY OF THE INVENTION

It is one object of the present invention to provide a modulator to generate a CPM.

It is a second object of the present invention to provide a GMSK modulator.

A third object of the present invention is to provide a GMSK modulator with reduced complexity.

A fourth object of the present invention is to provide a GMSK modulator that takes advantage of both the distribution of a nominal phase constellation (NPC), and the NPC itself to reduce the complexity of the modulator.

One or more of the foregoing objects are met in whole or in part by the method for modulation described herein. The method reduces complexity by using fewer than all phase points in an NPC. The method includes the steps of storing an approximate phase constellation (APC) generated from the NPC, identifying the next baseband phase point in the APC using an N-bit input word, and outputting the next baseband phase point.

The APC may include, for example, phase points comprising in-phase and quadrature-phase values representing a subset of the NPC or phase points derived from the NPC. Note, therefore, that the APC is not limited to including only phase points contained in the NPC. In reducing the number of phase points used in the modulation, the present modulator may identify and group phase points differing by less than a phase threshold. The APC may then store a phase point commensurate with the phase points in each group. The phase threshold may be, for example, 3 degrees.

In identifying the next baseband phase point, the method may shift an input bit into an N-bit shift register (with an N-bit output) and apply the N-bit output to a memory that stores the APC. The memory thereby outputs the next baseband phase point. Alternatively, the method may identify the next baseband phase point by applying an input bit to a finite state machine which outputs the next baseband phase point.

DETAILED DESCRIPTION OF THE INVENTION

At first glance, it would seem an inherent contradiction to describe a CPM with a constellation of discrete phase points.

However, this idea turns out to be a useful paradigm. When a CPM is sampled at a multiple of the symbol rate, then there exist only a finite number of values that the phase of the CPM can take. This finite set of phase points will hereafter be referred to as the nominal phase constellation (NPC). The present invention uses the distribution of the possible phase points to simplify the modulator implementation by defining an approximate phase constellation (APC). The APC leads directly to a reduced complexity phase constellation modulator.

Figure 1:
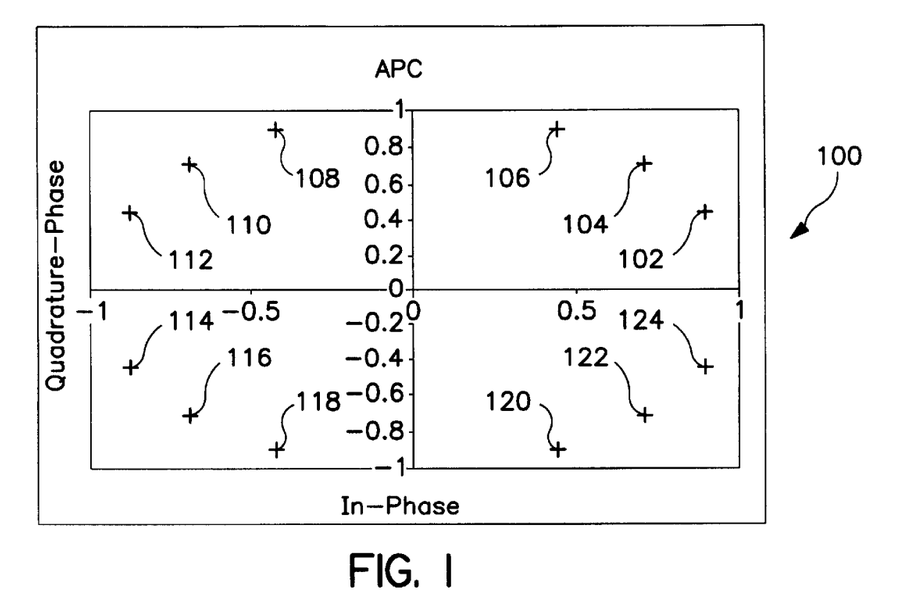
FIG. 1 illustrates an approximate phase constellation (APC) for GMSK, BT=⅙ truncated to L=6.

Turning now to FIG. 1, that figure shows an APC 100 including the set of phase points 102–124 used in one implementation of the present GMSK modulator. In particular, the APC 100 is associated with a GMSK modulation scheme with BT=⅙, and the frequency deviation pulse truncated to L=6 symbol intervals.

Each of the phase points 102–124 is represented in FIG. 1 by an in-phase (I) value and a quadrature-phase (Q) value. For example, the phase point 102 corresponds approximately to an I value of 0.8, and a Q value of approximately 0.4. The I value and Q value scale cosine and sine signal components respectively (See the discussion with respect to FIG. 4, below). However, the phase points need not be decomposed into I and Q components, but may be represented instead in the angle domain, by a single angle offset.

The frequency deviation pulse, g(t), (sometimes referred to simply as the frequency pulse), is used to generate the phase transition function, q(t), and in this case is truncated to LT seconds. In one embodiment of the present invention, L=6. A frequency deviation pulse truncated to LT seconds results in at most $2^L$ possible phase points in a complete NPC generated by sampling the GMSK waveform at one sample per symbol interval.

Although there are, in general, $2^L$ possible phase points in a complete NPC, many of the phase points overlap on top of each other. Thus, for L=6, 28 of the 64 phase points are redundant. In other words, the modulation can be exactly performed at a rate of one sample per symbol interval using only 36 phase points.

Furthermore, many of the unique phase points in the NPC lie very close to each other, as shown in FIG. 7. FIG. 7a illustrates an NPC for GMSK modulation with BT=⅙, L=6, 1× sampled at the center of each chip. FIG. 7b shows an NPC for GMSK modulation with BT=⅙, L=6, 1× sampled at an offset of ½ chip (i.e., sampled between chips). FIGS. 7c and 7d are similar to FIGS. 7a and 7b, respectively, but show NPCs associated with 2× sampling (i.e., oversampling). Note that in FIG. 7a, the unique phase points may be grouped into 12 sets of 3 phase points (e.g., the phase point group 702), where each of the 3 phase points in each group differs by less than 3 degrees from each of the other phase points in the group.

Thus, the APC of FIG. 1 may use only 12 phase points at the cost of an extremely small degradation introduced in the modulated waveform. As an example, with L=6 at one sample per symbol interval, the error in the modulated waveform is at −37 dB with respect to the signal constructed using the complete NPC. The phase threshold determines the number of phase points that may be eliminated. Both the phase threshold and the sampling rate determine the amount of degradation. In the discussion above, the phase threshold was approximately 3 degrees. When more or less degradation is allowable (depending on the particular communication system in which the modulator is employed), the phase threshold may be increased or decreased accordingly.

In general, the APC includes phase points commensurate with the grouping of phase points observed in the NPC as determined by the phase threshold. As an example, the phase point group 702 is represented in the APC 100 by (at least) the single phase point 104. The phase point 104 may, for example, be one of the phase points in the phase group 702, an average of the phase points in the group 702, or another commensurate phase point chosen in accordance with other criteria. As an example, the phase point 104 may be chosen to represent the phase point group 702 while introducing a minimal amount of (or controlled amount of) signal degradation.

In storing the APC, it is further noted that the phase points are symmetrically placed in each quadrant. Thus, in FIG. 1, for example, the phase points 102–106, 108–112, 114–118, and 120–124 are reflections of each other about the X or Y axis. Thus, rather than storing all 12 phase points 102–124 separately, only three values need be stored to represent the APC.

In operation the modulator uses an established mapping between the bitstream input and the APC. For a close group of phase points in the NPC that do not differ by more than the phase threshold, the APC stores one phase point of a value commensurate with the group. Then, whenever an ideal modulator would be called upon, mathematically, to use a phase point not actually in the APC, the phase constellation modulator selects (as the next phase point) the closest neighbor that exists in the APC.

Figure 2:
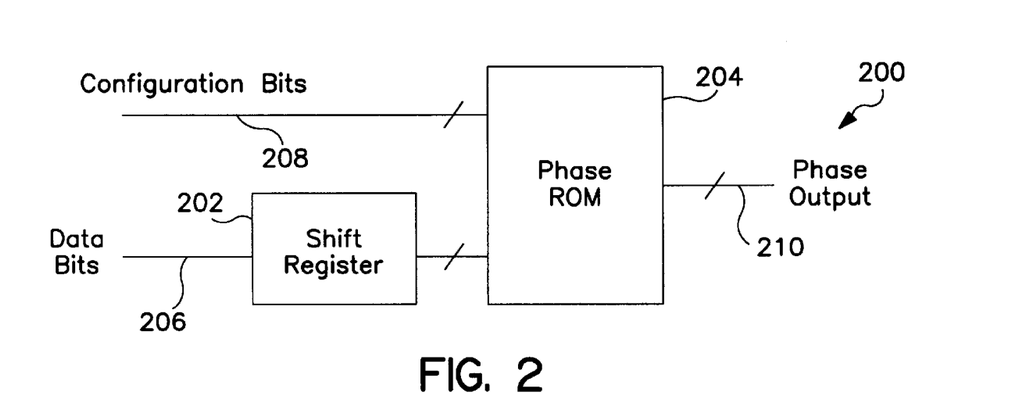
FIG. 2 is a high level block diagram showing one possible implementation of a baseband CPM waveform generator with digital output.

Turning now to FIG. 2, a high level block diagram of a modulator 200 according to the present invention is shown. The modulator 200 includes an N-bit shift register 202 and a phase ROM 204 (which stores the APC). The modulator 200 accepts an input bit on a data input 206, configuration bits on a configuration input 208, and produces the next phase of the transmitted waveform on a next phase output 210.

As each data bit is presented on the data input 206, the shift register 202 shifts the data bit into the shift register 202 and discards the oldest bit. In general, the shift register 202 produces an N-bit output which forms part of an address (which depends on the last N input bits) for the phase ROM 204. Another part of the address may optionally be provided by the configuration input 208, which may for example (and as discussed in more detail below) correspond to an even symbol or odd symbol indicator. The address acts as a next phase selector input to identify a next phase point which is, in turn, output by the phase ROM 204 on the phase output 210.

It is noted that many variations and alternative implementations of the shift register 202 and phase ROM 204 are possible. For example, both may be replaced by a single state machine which transitions between states with each new input bit. The state machine may then output the next phase value using combinatorial logic that decodes the present state. The state machine (or the shift register 202 and phase ROM 204) may be implemented in combinatorial logic, for example, or a combination of hardware and software.

Figure 3:
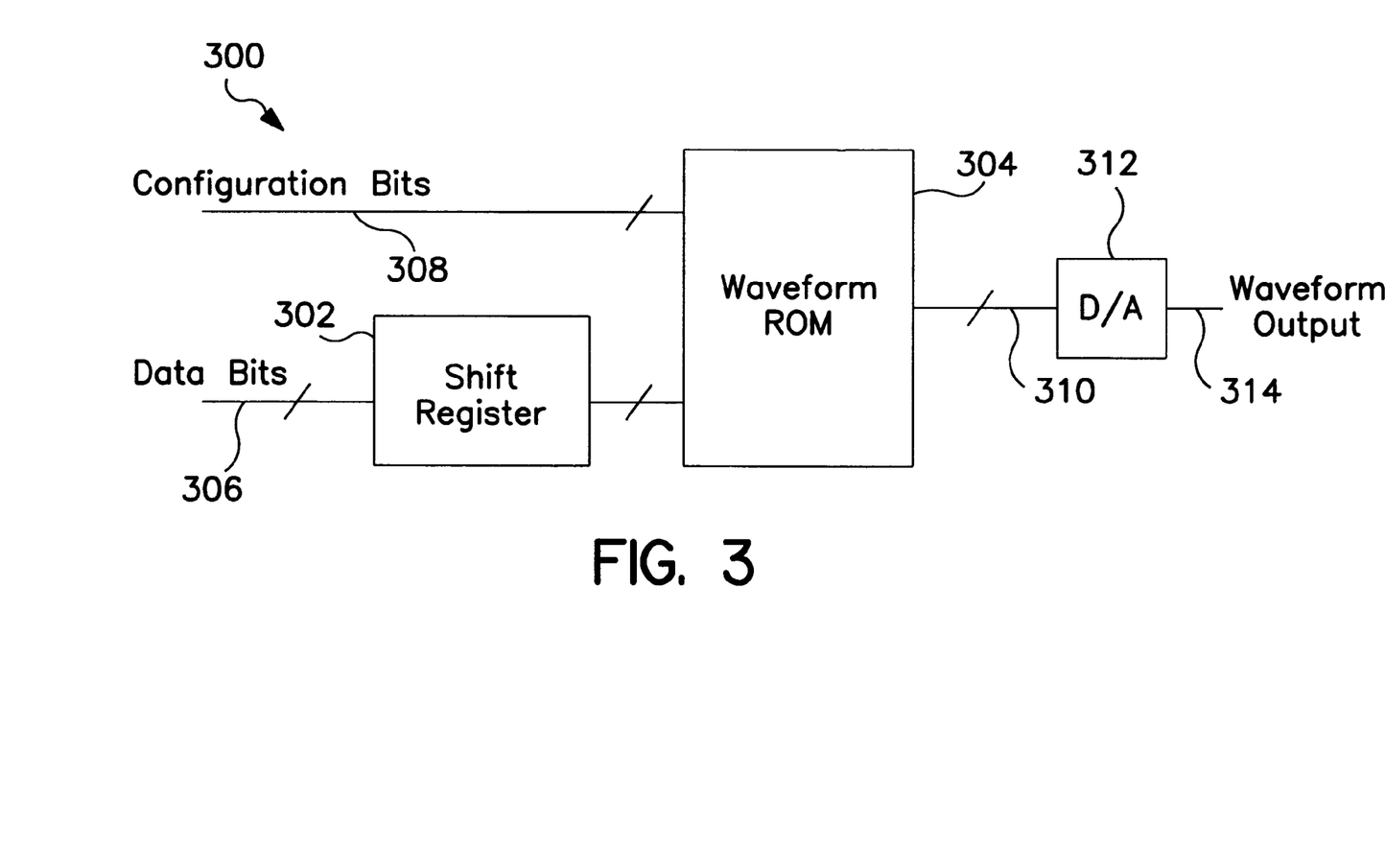
FIG. 3 is a high level block diagram showing one possible implementation of an intermediate frequency CPM waveform generator with analog output.

Turning now to FIG. 3, that figure illustrates an embodiment of an intermediate frequency (IF) CPM waveform generator 300 according to the present invention. The generator 300 includes an N-bit shift register 302 and a waveform ROM 304. The generator 300 accepts an input bit on a data input 306, configuration bits on a configuration input 308, and produces the next digital CPM waveform value on a digital waveform output 310. The digital waveform value is converted to analog by the D/A converter 312 which produces the actual analog CPM waveform on the waveform output 314.

The generator 300 operates much like the modulator 200 with respect to the input data bits and configuration bits. However, the waveform ROM 304 directly stores samples of the CPM waveform (i.e., cos(wt+phase(t)), where w/2π is the IF used). Note that when w is chosen such that the IF is a multiple of the symbol rate (i.e., w=2πk/T, where T is the symbol interval), then the phase contribution from w is constant, and the APC is preserved. This fact allows the direct output of the CPM signal at an IF, thus eliminating the need for an I-Q modulator. The generator 300 preferably uses a digital to analog (D/A) converter 312 that operates at at least twice the IF rate or four times the chip rate. The modulator of FIG. 3 thus eliminates the dual I-Q D/A converters in an I-Q modulator and therefore the problems that potentially result from mismatched D/A gain and conversion speed.

Figure 4:
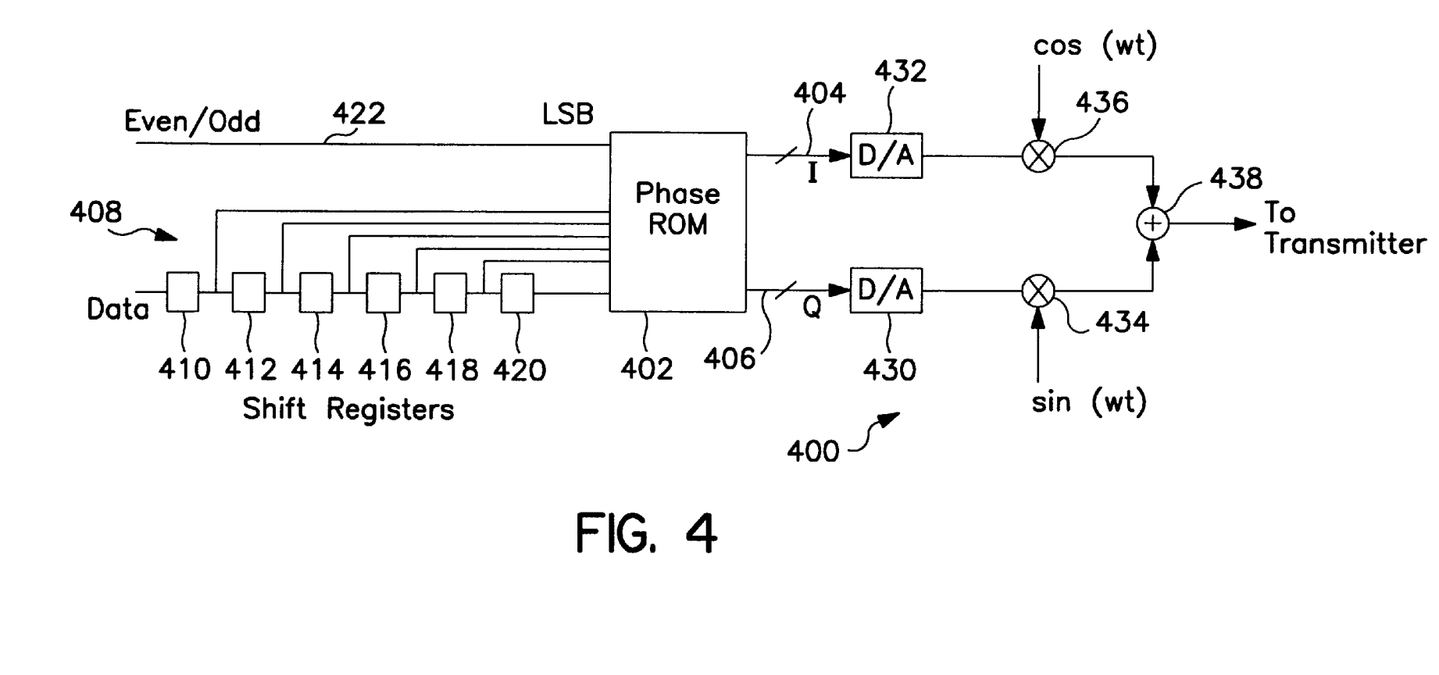
FIG. 4 shows a more detailed block diagram of one possible implementation of a GMSK modulator with absolute phase encoding and BT=⅙ truncated to L=6, whose analog output has been shifted to an intermediate frequency.

Turning now to FIG. 4, that figure shows a more detailed block diagram of a modulator 400. The modulator 400 includes a phase ROM 402 outputting in-phase (I) values on the I output 404 and quadrature-phase (Q) values on the Q output 406. The modulator 400 includes a shift register 408 formed from several 1-bit registers 410–420. An even/odd input 422 is also provided.

Each register output is connected to the phase ROM 402 to provide an address that identifies the next phase (e.g., one phase point in the APC) stored in the phase ROM 402. The even/odd input 422 also forms part of the address and, as described below, links transmitted bits to absolute phase information (as opposed to the inherently differential encoding of bits in typical minimum shift keying). Linking the transmitted bits to absolute phase increases the resultant signal gain by approximately 1.5 dB.

The phase ROM 402 responds to the address by outputting the next phase on the I and Q outputs 404–406. Typically, the I output 404 and Q output 406 are routed to digital-to-analog converters 430–432, in-phase and quadrature mixers 434–436, and an adder 438 to produce the resultant modulated waveform at an intermediate frequency for transmission. The inphase and quadrature phase ROM output values may be quantized, for example, to 8-bits for subsequent 8-bit digital-to-analog converters.

With respect to the address formed using the shift register 410–420 output and the even/odd bit 422, the linking of transmitted bits to absolute phase is explained with reference to Table 1, below:

TABLE 1

| k | a (k) | b (k) | d (k) | d (k − 1) | even/odd | phase |
|---|---|---|---|---|---|---|
| 0 | x | 1 | −1 | x | 1 | 0 |
| 1 | −1 | 1 | −1 | −1 | −1 | 270 |
| 2 | −1 | 0 | 1 | −1 | 1 | 180 |
| 3 | −1 | 0 | 1 | 1 | −1 | 90 |
| 4 | 1 | 0 | 1 | 1 | 1 | 180 |
| 5 | 1 | 1 | −1 | 1 | −1 | 270 |
| 6 | 1 | 1 | −1 | −1 | 1 | 0 |
| 7 | −1 | 1 | −1 | −1 | −1 | 270 |

In Table 1, $a(k)=(-1)^k(d(k))(d(k-1))$ and represents differentially encoded bits, k is the bit number, b(k) represents the binary data to be transmitted, d(k) represents the data to be transmitted in NRZ form, even/odd represents whether k is even or odd, a(k) represents the change in modulator state (e.g., plus or minus 90 degrees) for the current bit, and 'phase' represents the final phase value effected (or nearly effected due to the gradual changes in phase) by the given data bit to be transmitted.

It may be seen from Table 1 that when b(k)=1, the phase is either 270 or 0, depending on whether 'k' is even or odd, and that when b(k)=0, the phase is either 180 or 90, depending on whether 'k' is even or odd. Thus, adding the extra even/odd input 422 allows the phase ROM 402 to produce the absolute phase that will result, and link the transmitted data (i.e., the b(k) or set of b(k) values stored in the shift register) to the absolute phase of the carrier. A second example is provided for a different bit sequence below in Table 2.

TABLE 2

| k | a (k) | b (k) | d (k) | d (k − 1) | even/odd | phase |
|---|---|---|---|---|---|---|
| 0 | x | 1 | −1 | x | 1 | 0 |
| 1 | 1 | 0 | 1 | −1 | −1 | 90 |
| 2 | 1 | 0 | 1 | 1 | 1 | 180 |
| 3 | 1 | 1 | −1 | 1 | −1 | 270 |
| 4 | −1 | 0 | 1 | −1 | 1 | 180 |
| 5 | −1 | 0 | 1 | 1 | −1 | 90 |
| 6 | −1 | 1 | −1 | 1 | 1 | 0 |
| 7 | 1 | 0 | 1 | −1 | −1 | 90 |

Table 3 and Table 4, below, provide one possible implementation of the phase ROM 402 responding to seven input (next phase selectors) bits or, stated another way, a seven bit address (e.g., provided by the shift register 308 and the even/odd input 422). The decimal value of the address is present in the first column of Tables 3 and 4. As noted above, an even/odd bit forms part of the address, and in Tables 3 and 4 is included as the least significant bit of the decimal value in the first column.

Table 3 provides the appropriate output for the in-phase component of the modulated signal. Similarly, Table 4 provides the appropriate output for the quadrature component of the modulated signal. The APC is represented, as shown in the second, third, and fourth columns of Tables 3 and 4, by in-phase and quadrature values 0.44228, 0.70711, and 0.89668. Finally, the symmetry of phase points, noted above, is used to further simplify the phase ROM, by including a negative/positive indicator in column five, rather than duplicating identical phase magnitudes that are simply opposite in sign. As an example, for the input address 42, the in-phase output will be −0.70711 and the quadrature output will be +0.70711.

Note that the phase ROM may be implemented in many ways. For example, the phase ROM may produce a four bit output according to Tables 3 and 4 that, in turn, address a phase value ROM that stores the actual in-phase and quadrature component values. This implementation can be very attractive. Upon closer inspection of the tables, it is clear that column 3-2 is identical to column 4-4, column 3-3 is identical to column 4-3, column 3-4 is identical to column 4-2, and the inverse and reverse ordered version of column 3-5 is identical to column 4-5. This result is intuitively appealing as it only takes four bits of information to specify twelve different phase points. In another embodiment, however, only one phase ROM is used that outputs the component values according to any desired granularity (e.g., 8 bits) in response to the input address.

TABLE 3

In-phase Component

| Column 3-1 Input | Column 3-2 Out = 0.44228 | Column 3-3 Out = 0.70711 | Column 3-4 Out = 0.89668 | Column 3-5 Out = negative |
|---|---|---|---|---|
| 0 | 0 | 1 | 0 | 0 |
| 1 | 0 | 1 | 0 | 0 |

TABLE 3-continued

In-phase Component

| Column 3-1 Input | Column 3-2 Out = 0.44228 | Column 3-3 Out = 0.70711 | Column 3-4 Out = 0.89668 | Column 3-5 Out = negative |
|---|---|---|---|---|
| 2 | 0 | 1 | 0 | 0 |
| 3 | 0 | 1 | 0 | 0 |
| 4 | 0 | 0 | 1 | 0 |
| 5 | 1 | 0 | 0 | 0 |
| 6 | 0 | 0 | 1 | 0 |
| 7 | 1 | 0 | 0 | 0 |
| 8 | 1 | 0 | 0 | 1 |
| 9 | 0 | 0 | 1 | 0 |
| 10 | 1 | 0 | 0 | 1 |
| 11 | 0 | 0 | 1 | 0 |
| 12 | 0 | 1 | 0 | 1 |
| 13 | 0 | 1 | 0 | 0 |
| 14 | 0 | 1 | 0 | 1 |
| 15 | 0 | 1 | 0 | 0 |
| 16 | 0 | 0 | 1 | 0 |
| 17 | 1 | 0 | 0 | 1 |
| 18 | 0 | 0 | 1 | 0 |
| 19 | 1 | 0 | 0 | 1 |
| 20 | 0 | 1 | 0 | 0 |
| 21 | 0 | 1 | 0 | 1 |
| 22 | 0 | 1 | 0 | 0 |
| 23 | 0 | 1 | 0 | 1 |
| 24 | 0 | 1 | 0 | 1 |
| 25 | 0 | 1 | 0 | 1 |
| 26 | 0 | 1 | 0 | 1 |
| 27 | 0 | 1 | 0 | 1 |
| 28 | 1 | 0 | 0 | 1 |
| 29 | 0 | 0 | 1 | 1 |
| 30 | 1 | 0 | 0 | 1 |
| 31 | 0 | 0 | 1 | 1 |
| 32 | 1 | 0 | 0 | 0 |
| 33 | 0 | 0 | 1 | 0 |
| 34 | 1 | 0 | 0 | 0 |
| 35 | 0 | 0 | 1 | 0 |
| 36 | 0 | 1 | 0 | 0 |
| 37 | 0 | 1 | 0 | 0 |
| 38 | 0 | 1 | 0 | 0 |
| 39 | 0 | 1 | 0 | 0 |
| 40 | 0 | 1 | 0 | 1 |
| 41 | 0 | 1 | 0 | 0 |
| 42 | 0 | 1 | 0 | 1 |
| 43 | 0 | 1 | 0 | 0 |
| 44 | 0 | 0 | 1 | 1 |
| 45 | 1 | 0 | 0 | 0 |
| 46 | 0 | 0 | 1 | 1 |
| 47 | 1 | 0 | 0 | 0 |
| 48 | 0 | 1 | 0 | 0 |
| 49 | 0 | 1 | 0 | 1 |
| 50 | 0 | 1 | 0 | 0 |
| 51 | 0 | 1 | 0 | 1 |
| 52 | 1 | 0 | 0 | 0 |
| 53 | 0 | 0 | 1 | 1 |
| 54 | 1 | 0 | 0 | 0 |
| 55 | 0 | 0 | 1 | 1 |
| 56 | 0 | 0 | 1 | 1 |
| 57 | 1 | 0 | 0 | 1 |
| 58 | 0 | 0 | 1 | 1 |
| 59 | 1 | 0 | 0 | 1 |
| 60 | 0 | 1 | 0 | 1 |
| 61 | G | 1 | 0 | 1 |
| 62 | 0 | 1 | 0 | 1 |
| 63 | 0 | 1 | 0 | 1 |
| 64 | 0 | 1 | 0 | 0 |
| 65 | 0 | 1 | 0 | 0 |
| 66 | 0 | 1 | 0 | 0 |
| 67 | 0 | 1 | 0 | 0 |
| 68 | 0 | 0 | 1 | 0 |
| 69 | 1 | 0 | 0 | 0 |
| 70 | 0 | 0 | 1 | 0 |
| 71 | 1 | 0 | 0 | 0 |
| 72 | 1 | 0 | 0 | 1 |
| 73 | 0 | 0 | 1 | 0 |
| 74 | 1 | 0 | 0 | 1 |

TABLE 3-continued

In-phase Component

| Column 3-1 Input | Column 3-2 Out = 0.44228 | Column 3-3 Out = 0.70711 | Column 3-4 Out = 0.89668 | Column 3-5 Out = negative |
|---|---|---|---|---|
| 75 | 0 | 0 | 1 | 0 |
| 76 | 0 | 1 | 0 | 1 |
| 77 | 0 | 1 | 0 | 0 |
| 78 | 0 | 1 | 0 | 1 |
| 79 | 0 | 1 | 0 | 0 |
| 80 | 0 | 0 | 1 | 0 |
| 81 | 1 | 0 | 0 | 1 |
| 82 | 0 | 0 | 1 | 0 |
| 83 | 1 | 0 | 0 | 1 |
| 84 | 0 | 1 | 0 | 0 |
| 85 | 0 | 1 | 0 | 1 |
| 86 | 0 | 1 | 0 | 0 |
| 87 | 0 | 1 | 0 | 1 |
| 88 | 0 | 1 | 0 | 1 |
| 89 | 0 | 1 | 0 | 1 |
| 90 | 0 | 1 | D | 1 |
| 91 | 0 | 1 | 0 | 1 |
| 92 | 1 | 0 | 0 | 1 |
| 93 | 0 | 0 | 1 | 1 |
| 94 | 1 | 0 | 0 | 1 |
| 95 | 0 | 0 | 1 | 1 |
| 96 | 1 | 0 | 0 | 0 |
| 97 | 0 | 0 | 1 | 0 |
| 98 | 1 | 0 | 0 | 0 |
| 99 | 0 | 0 | 1 | 0 |
| 100 | 0 | 1 | 0 | 0 |
| 101 | 0 | 1 | 0 | 0 |
| 102 | 0 | 1 | 0 | 0 |
| 103 | 0 | 1 | 0 | 0 |
| 104 | 0 | 1 | 0 | 1 |
| 105 | 0 | 1 | 0 | 0 |
| 106 | 0 | 1 | 0 | 1 |
| 107 | 0 | 1 | 0 | 0 |
| 108 | 0 | 0 | 1 | 1 |
| 109 | 1 | 0 | 0 | 0 |
| 110 | 0 | 0 | 1 | 1 |
| 111 | 1 | 0 | 0 | 0 |
| 112 | 0 | 1 | 0 | 0 |
| 113 | 0 | 1 | 0 | 1 |
| 114 | 0 | 1 | 0 | 0 |
| 115 | 0 | 1 | 0 | 1 |
| 116 | 1 | 0 | 0 | 0 |
| 117 | 0 | 0 | 1 | 1 |
| 118 | 1 | 0 | 0 | 0 |
| 119 | 0 | 0 | 1 | 1 |
| 120 | 0 | 0 | 1 | 1 |
| 121 | 1 | 0 | 0 | 1 |
| 122 | 0 | 0 | 1 | 1 |
| 123 | 1 | 0 | 0 | 1 |
| 124 | 0 | 1 | 0 | 1 |
| 125 | 0 | 1 | 0 | 1 |
| 126 | 0 | 1 | 0 | 1 |
| 127 | 0 | 1 | 0 | 1 |

TABLE 4

Quadrature Component

| Column 4-1 Input | Column 4-2 Out = 0.44228 | Column 4-3 Out = 0.70711 | Column 4-4 Out = 0.89668 | Column 4-5 Out = negative |
|---|---|---|---|---|
| 0 | 0 | 1 | 0 | 0 |
| 1 | 0 | 1 | 0 | 0 |
| 2 | 0 | 1 | 0 | 0 |
| 3 | 0 | 1 | 0 | 0 |
| 4 | 1 | 0 | 0 | 0 |
| 5 | 0 | 0 | 1 | 0 |
| 6 | 1 | 0 | 0 | 0 |
| 7 | 0 | 0 | 1 | 0 |

TABLE 4-continued

Quadrature Component

| Column 4-1 Input | Column 4-2 Out = 0.44228 | Column 4-3 Out = 0.70711 | Column 4-4 Out = 0.89668 | Column 4-5 Out = negative |
|---|---|---|---|---|
| 8 | 0 | 0 | 1 | 0 |
| 9 | 1 | 0 | 0 | 1 |
| 10 | 0 | 0 | 1 | 0 |
| 11 | 1 | 0 | 0 | 1 |
| 12 | 0 | 1 | 0 | 0 |
| 13 | 0 | 1 | 0 | 1 |
| 14 | 0 | 1 | 0 | 0 |
| 15 | 0 | 1 | 0 | 1 |
| 16 | 1 | 0 | 0 | 1 |
| 17 | 0 | 0 | 1 | 0 |
| 18 | 1 | 0 | 0 | 1 |
| 19 | 0 | 0 | 1 | 0 |
| 20 | 0 | 1 | 0 | 1 |
| 21 | 0 | 1 | 0 | 0 |
| 22 | 0 | 1 | 0 | 1 |
| 23 | 0 | 1 | 0 | 0 |
| 24 | 0 | 1 | 0 | 1 |
| 25 | 0 | 1 | 0 | 1 |
| 26 | 0 | 1 | 0 | 1 |
| 27 | 0 | 1 | 0 | 1 |
| 28 | 0 | 0 | 1 | 1 |
| 29 | 1 | 0 | 0 | 1 |
| 30 | 0 | 0 | 1 | 1 |
| 31 | 1 | 0 | 0 | 1 |
| 32 | 0 | 0 | 1 | 0 |
| 33 | 1 | 0 | 0 | 0 |
| 34 | 0 | 0 | 1 | 0 |
| 35 | 1 | 0 | 0 | 0 |
| 36 | 0 | 1 | 0 | 0 |
| 37 | 0 | 1 | 0 | 0 |
| 38 | 0 | 1 | 0 | 0 |
| 39 | 0 | 1 | 0 | 0 |
| 40 | 0 | 1 | 0 | 0 |
| 41 | 0 | 1 | 0 | 1 |
| 42 | 0 | 1 | 0 | 0 |
| 43 | 0 | 1 | 0 | 1 |
| 44 | 1 | 0 | 0 | 0 |
| 45 | 0 | 0 | 1 | 1 |
| 46 | 1 | 0 | 0 | 0 |
| 47 | 0 | 0 | 1 | 1 |
| 48 | 0 | 1 | 0 | 1 |
| 49 | 0 | 1 | 0 | 0 |
| 50 | 0 | 1 | 0 | 1 |
| 51 | 0 | 1 | 0 | 0 |
| 52 | 0 | 0 | 1 | 1 |
| 53 | 1 | 0 | 0 | 0 |
| 54 | 0 | 0 | 1 | 1 |
| 55 | 1 | 0 | 0 | 0 |
| 56 | 1 | 0 | 0 | 1 |
| 57 | 0 | 0 | 1 | 1 |
| 58 | 1 | 0 | 0 | 1 |
| 59 | 0 | 0 | 1 | 1 |
| 60 | 0 | 1 | 0 | 1 |
| 61 | 0 | 1 | 0 | 1 |
| 62 | 0 | 1 | 0 | 1 |
| 63 | 0 | 1 | 0 | 1 |
| 64 | 0 | 1 | 0 | 0 |
| 65 | 0 | 1 | 0 | 0 |
| 66 | 0 | 1 | 0 | 0 |
| 67 | 0 | 1 | 0 | 0 |
| 68 | 1 | 0 | 0 | 0 |
| 69 | 0 | 0 | 1 | 0 |
| 70 | 1 | 0 | 0 | 0 |
| 71 | 0 | 0 | 1 | 0 |
| 72 | 0 | 0 | 1 | 0 |
| 73 | 1 | 0 | 0 | 1 |
| 74 | 0 | 0 | 1 | 0 |
| 75 | 1 | 0 | 0 | 1 |
| 76 | 0 | 1 | 0 | 0 |
| 77 | 0 | 1 | 0 | 1 |
| 78 | 0 | 1 | 0 | 0 |
| 79 | 0 | 1 | 0 | 1 |
| 80 | 1 | 0 | 0 | 1 |
| 81 | 0 | 0 | 1 | 0 |
| 82 | 1 | 0 | 0 | 1 |
| 83 | 0 | 0 | 1 | 0 |
| 84 | 0 | 1 | 0 | 1 |
| 85 | 0 | 1 | 0 | 0 |
| 86 | 0 | 1 | 0 | 1 |
| 87 | 0 | 1 | 0 | 0 |
| 88 | 0 | 1 | 0 | 1 |
| 89 | 0 | 1 | 0 | 1 |
| 90 | 0 | 1 | 0 | 1 |
| 91 | 0 | 1 | 0 | 1 |
| 92 | 0 | 0 | 1 | 1 |
| 93 | 1 | 0 | 0 | 1 |
| 94 | 0 | 0 | 1 | 1 |
| 95 | 1 | 0 | 0 | 1 |
| 96 | 0 | 0 | 1 | 0 |
| 97 | 1 | 0 | 0 | 0 |
| 98 | 0 | 0 | 1 | 0 |
| 99 | 1 | 0 | 0 | 0 |
| 100 | 0 | 1 | 0 | 0 |
| 101 | 0 | 1 | 0 | 0 |
| 102 | 0 | 1 | 0 | 0 |
| 103 | 0 | 1 | 0 | 0 |
| 104 | 0 | 1 | 0 | 0 |
| 105 | 0 | 1 | 0 | 1 |
| 106 | 0 | 1 | 0 | 0 |
| 107 | 0 | 1 | 0 | 1 |
| 108 | 1 | 0 | 0 | 0 |
| 109 | 0 | 0 | 1 | 1 |
| 110 | 1 | 0 | 0 | 0 |
| 111 | 0 | 0 | 1 | 1 |
| 112 | 0 | 1 | 0 | 1 |
| 113 | 0 | 1 | 0 | 0 |
| 114 | 0 | 1 | 0 | 1 |
| 115 | 0 | 1 | 0 | 0 |
| 116 | 0 | 0 | 1 | 1 |
| 117 | 1 | 0 | 0 | 0 |
| 118 | 0 | 0 | 1 | 1 |
| 119 | 1 | 0 | 0 | 0 |
| 120 | 1 | 0 | 0 | 1 |
| 121 | 0 | 0 | 1 | 1 |
| 122 | 1 | 0 | 0 | 1 |
| 123 | 0 | 0 | 1 | 1 |
| 124 | 0 | 1 | 0 | 1 |
| 125 | 0 | 1 | 0 | 1 |
| 126 | 0 | 1 | 0 | 1 |
| 127 | 0 | 1 | 0 | 1 |

Figure 5:
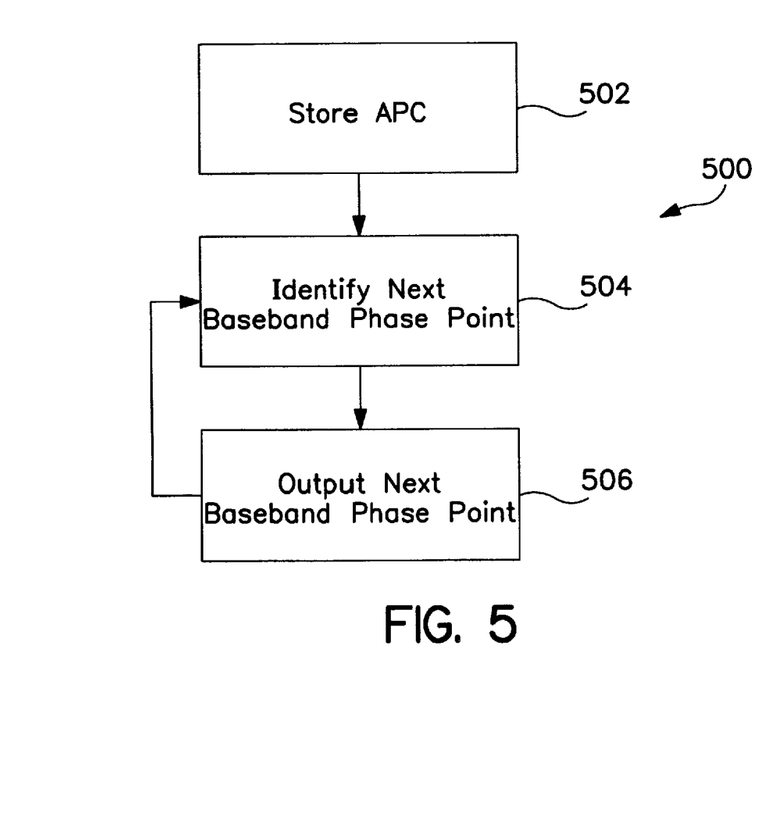
FIG. 5 presents a high level flow diagram of modulation according to the present invention.

Turning now to FIG. 5, that figure illustrates a high level block diagram 500 of the modulation method of the present invention. Starting at the storing step 502, the APC is stored. The phase points may be stored and output as inphase and quadrature phase values, or as angle values. Alternatively, actual CPM waveform samples may be stored, as noted above with respect to FIG. 3.

At the identify step 504, the method determines which phase point is the next phase. Thus, for example, the address applied to the phase ROM 402 may identify the next phase. Subsequently, the method, at the output step 506, produces the next phase value for subsequent modulation. Processing then branches back to the identify step 504 in which, typically, the next input bit determines a new next phase.

Figure 6:
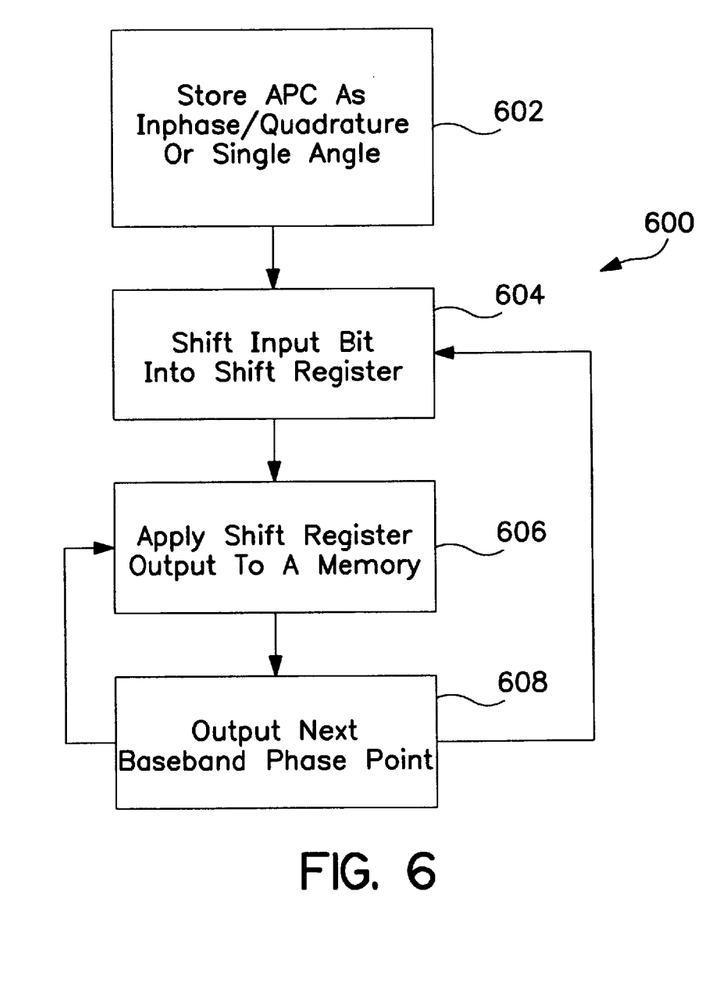
FIG. 6 shows a high level flow diagram of modulation according to the present invention using a shift register.
Figure 7A:
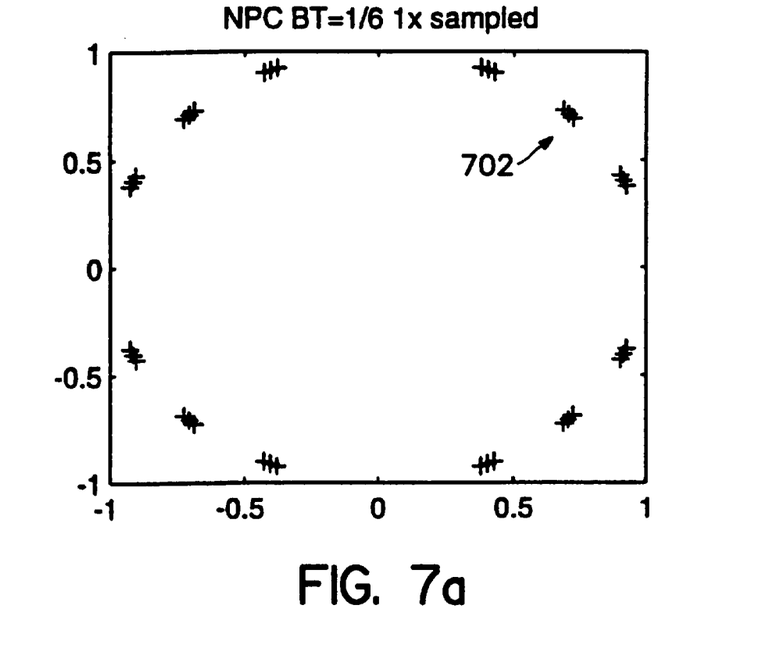
FIG. 7a–7d are graphs illustrating the phase points for an NPC at different sampling rates and offsets.
Figure 7B:
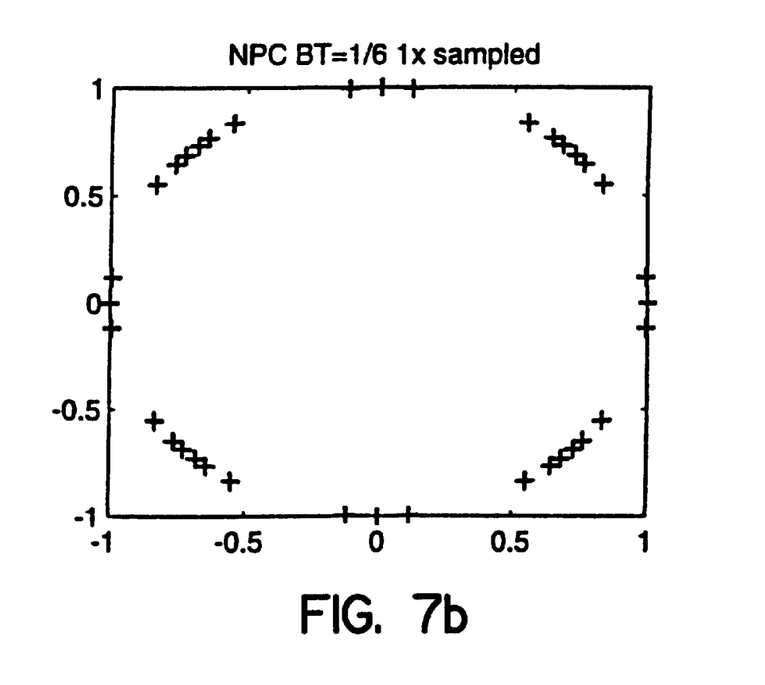
Figure 7C:
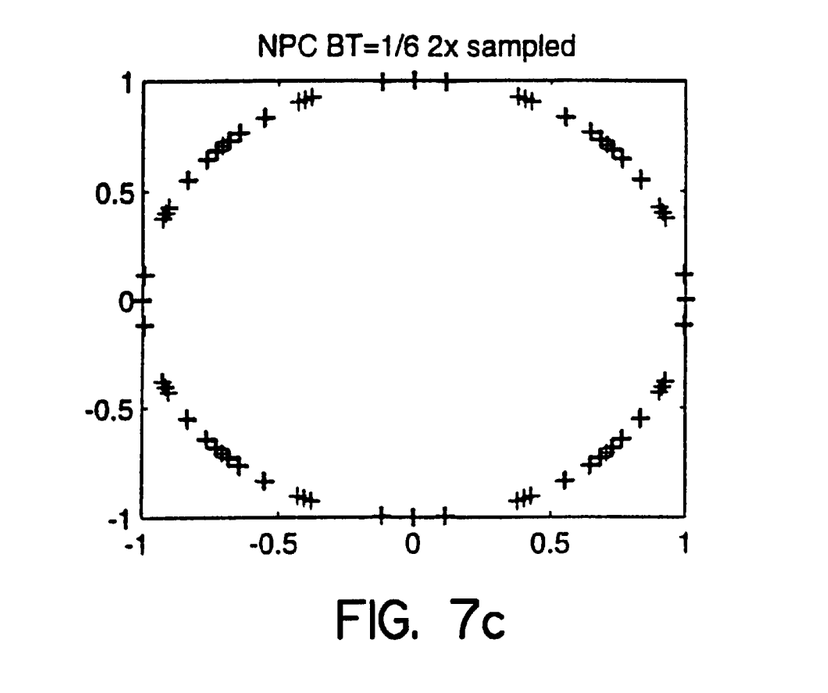
Figure 7D:
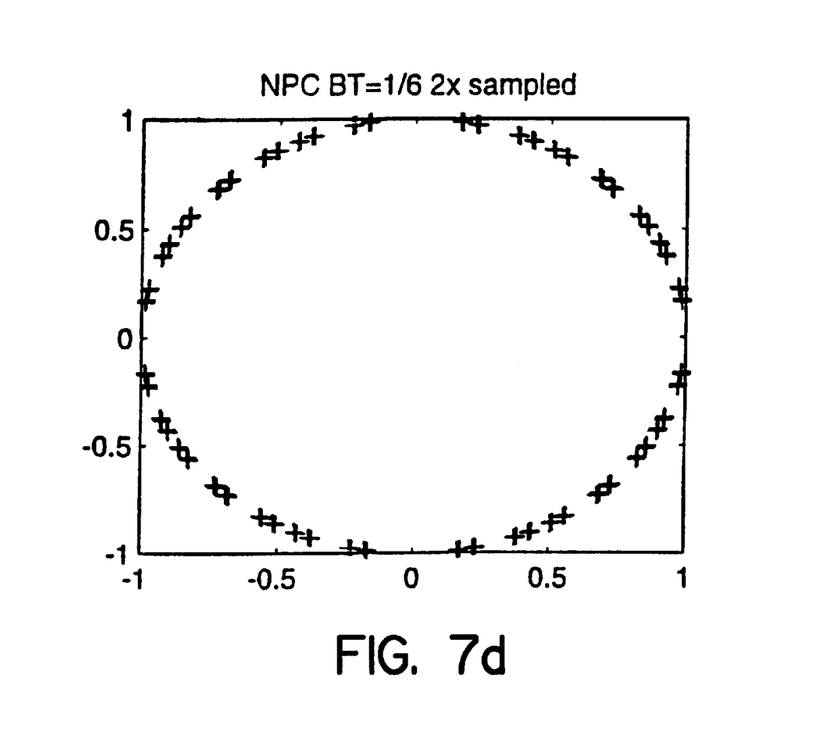

With respect to FIG. 6, that figure illustrates a more detailed block diagram of a modulation method 600 according to the present invention. The modulation method 600 includes a storing step 602, a shift step 604, an application step 606, and an output step 608. Starting at the storing step 602, the method saves the APC generated from a complete NPC. As noted above with respect to the storing step 502, the phase points may be stored as inphase and quadrature phase values or as angle values, and are generally commensurate with groups of phase points that differ by less than a predetermined phase threshold.

At step 604, the next bit to be transmitted (the next input bit) is shifted into a shift register (e.g., shift register 408). The oldest bit in the shift register is discarded. At step 606, the bits stored in the shift register (i.e., the N-bit shift register output) are applied as an address to a memory, for example, the phase ROM 402. The address (which may further include configuration bits) determines the next phase. The memory outputs the next phase in response to the address. Processing continues at step 604, at which the next bit to be transmitted is shifted into the shift register.

The present invention thereby provides a phase constellation modulator that significantly reduces the complexity of implementing a CPM. Furthermore, the invention achieves these reductions without sacrificing signal quality. More reliable and cost effective communication systems result.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for implementing a continuous phase modulation by using fewer phase points than those that exist in a nominal phase constellation, the method comprising:
   storing an approximate phase constellation (APC) generated from a nominal phase constellation (NPC), said APC comprising fewer phase points in number than a complete set of phase points in said NPC;
   identifying a next phase from said approximate phase constellation using an N-bit input word; and
   outputting said next phase.

2. The method of claim 1, wherein said step of storing the APC comprises storing inphase and quadrature phase values representing each of said phase points in said APC.

3. The method of claim 1, wherein said step of storing the APC comprises storing a plurality of angle values.

4. The method of claim 1, wherein said step of storing the APC comprises a step of storing one of each unique phase point in said NPC.

5. The method of claim 1, wherein said step of storing an APC further comprises the steps of:
   identifying phase point groups in said NPC differing by less than a phase threshold;
   selecting a commensurate phase point for each of said phase point groups; and
   storing said commensurate phase points in said APC.

6. The method of claim 5, wherein said step of identifying phase point groups comprises identifying phase point groups in said NPC differing by less than approximately 3 degrees.

7. The method of claim 5, wherein said step of identifying the next phase comprises a step of providing an even/odd address bit to a memory that links input data bits in an input data stream to an absolute phase of a transmitted carrier.

8. The method of claim 1, wherein said step of identifying the next phase comprises a step of shifting an input bit into an N-bit shift register with an N-bit output and applying said N-bit output to a memory.

9. The method of claim 1, wherein said step of identifying the next phase further comprises a step of providing an even/odd address bit to a memory that links input data bits in an input data stream to an absolute phase of a transmitted carrier.

10. A continuous phase constellation modulator using fewer than all phase points that exist in a nominal phase constellation, the modulator comprising:
    a memory storing an approximate phase constellation (APC) comprising phase points fewer in number than a complete set of phase points in a nominal phase constellation (NPC);
    a next phase selector input; and
    a next phase output.

11. The modulator of claim 10, wherein each phase point in said APC comprises an in-phase value and a quadrature value.

12. The modulator of claim 10, wherein each phase point in said APC of phase points comprises an angle value.

13. The modulator of claim 10, wherein said APC excludes at least one overlapping phase point in said NPC.

14. The modulator of claim 13, wherein said APC stores one of each unique phase point in said NPC.

15. The modulator of claim 10, wherein said APC comprises phase points commensurate with phase point groups in said NPC.

16. The modulator of claim 15, wherein each of said phase point groups comprises NPC phase points differing by less than a phase threshold.

17. The modulator of claim 16, wherein said phase threshold is approximately 3 degrees.

18. The modulator of claim 16, further comprising an N-bit shift register having a data input and an N-bit shift register output, and wherein said next phase selector input is connected to said N-bit shift register output.

19. The modulator of claim 18, further comprising an even/odd input connected to said next phase selector input.

20. The modulator of claim 10, further comprising an N-bit shift register having a data input and an N-bit shift register output, and wherein said next phase selector input is connected to said N-bit shift register output.

21. The modulator of claim 20, further comprising an even/odd input connected to said next phase selector input.

22. A continuous phase modulation waveform generator for directly generating a continuous phase modulation waveform at an intermediate frequency, said generator comprising:
    a waveform memory storing a plurality of digital waveform samples of an intermediate frequency waveform characterized by an approximate phase constellation (APC), said APC comprising phase points fewer in number than a complete set of phase points in a nominal phase constellation (NPC);
    a next phase selector input;
    a digital waveform output; and
    a digital-to-analog converter connected to said digital waveform output.

23. The generator of claim 22, wherein said APC includes one of each unique phase point in said NPC.

24. The generator of claim 22, wherein said APC comprises phase points commensurate with phase point groups in said NPC.

25. The modulator of claim 24, wherein each of said phase point groups comprises NPC phase points differing by less than a phase threshold.

26. The generator of claim 25, wherein said phase threshold is approximately 3 degrees.

27. The generator of claim 22, further comprising an N-bit shift register having a data input and an N-bit shift register output, and wherein said next phase selector input is connected to said N-bit shift register output.

28. The generator of claim 27, further comprising an even/odd input connected to said next phase selector input.

29. The generator of claim 22, further comprising an even/odd input connected to said next phase selector input.

30. The generator of claim 22, wherein said intermediate frequency waveform has an intermediate frequency that is an integer multiple of a predetermined symbol rate.

* * * * *